United States Patent [19]

Lamlee

[11] 4,118,889
[45] Oct. 10, 1978

[54] WEARABLE SEEDLING CONTAINER

[76] Inventor: Stewart Lamlee, 55 W. 86th St., New York, N.Y. 10024

[21] Appl. No.: 732,983

[22] Filed: Oct. 15, 1976

[51] Int. Cl.² ............................................. A01G 9/02
[52] U.S. Cl. .......................................... 47/14; 47/61; 47/67; 47/69; 63/1 R; 206/423; 428/17
[58] Field of Search .................... 47/66, 55, 69, 14–16, 47/73, 77, 67, 59, 60, 61, 63, 64, 65; 428/14, 15, 17, 19, 22, 23–26, 28; 24/5, 6; 206/423; 63/1

[56] References Cited

U.S. PATENT DOCUMENTS

| D. 228,360 | 9/1973 | Sunshine | 47/67 |
| 1,848,219 | 3/1932 | Kerr | 47/14 |
| 2,180,726 | 11/1939 | Bradley | 47/55 |
| 2,722,778 | 11/1955 | Carufel | 47/14 |
| 3,199,250 | 8/1965 | Sawyer | 47/63 |
| 3,225,805 | 12/1965 | Wise | 47/66 |
| 3,605,335 | 9/1971 | Maitland | 47/67 |
| 3,704,545 | 12/1972 | Van Reisen | 47/69 |
| 3,949,568 | 4/1976 | Gallagher | 428/24 |
| 3,995,396 | 12/1976 | Spector | 206/423 |
| 4,000,580 | 1/1977 | Biehl | 47/14 |
| 4,051,625 | 10/1977 | Sawyer | 47/14 |

FOREIGN PATENT DOCUMENTS

| 66,660 | 6/1892 | Fed. Rep. of Germany | 47/67 |
| 471,720 | 6/1969 | Switzerland | 206/423 |

OTHER PUBLICATIONS

Cubisino, Marjorie, "Gifts for Indoor Gardening", *Good Housekeeping*, Dec. 1972, p. 162.

*Primary Examiner*—Edgar S. Burr
*Assistant Examiner*—James R. Feyrer
*Attorney, Agent, or Firm*—Brian L. Ribando

[57] ABSTRACT

A transparent seedling container has disposed therein a dry mass of material which is capable of absorbing water and a sproutable seed. Water is added to the mass and the germination of the seed is visible through the container walls. Means are provided for the suspension of the container which may be worn as an article of jewelry.

2 Claims, 4 Drawing Figures

WEARABLE SEEDLING CONTAINER

BACKGROUND OF THE INVENTION

Seedling sprouters in which a quantity of viable seeds may be placed in contact with a moisture bearing element are known in the art. In a few days time the seeds begin to sprout and the sprouts may be transferred to an area where further growth may take place. The sprouting of a seed is a fascinating phenomena to witness. The beginning of life in one of its most simple forms is an occasion which is of great educational value. U.S. Pat. No. 2,950,567, issued to Newman discloses a plant terrarium having a cylindrical base and an elongated transparent cover fitted thereto. The terrarium is adapted to contain a pot of soil in which a plant can grow. The terrarium structure includes means for retaining the pot in position within the terrarium and an air vent opening in the cover.

The present invention presents a seedling sprouter made of transparent material through which the sprouting of a seed may be seen. The sprouter contains a seed which is held against the container wall by a mass of moisture absorbent material such as sponge. A removable cap is provided to allow water to be added to the container and its contents when it is desired to begin the germination of the seed. The cap is provided with means allowing suspension of the container which may be worn as an article of jewelry. No such device is known in the prior art.

OBJECTS OF THE INVENTION

It is an object of this invention, therefore, to provide a seedling sprouter that is transparent so that the sprouting of a seed may be viewed.

It is another object of this invention to provide a seedling sprouter containing a seed and a dry mass of moisture absorbent material to which water may be added in order to cause the seed to germinate.

It is a further object of this invention to provide a transparent seedling sprouter having a removable cap allowing the addition of water to a viable seed and a moisture holding medium to cause the seed to sprout.

It is a still further object of the invention to provide a seedling sprouter of transparent material containing a viable seed which will sprout with the addition of water thereto wherein the sprouter is of sufficiently small size to allow the wearing thereof as an article of jewelry.

These and other objects of the invention will be apparent from the following description taken by way of example only in conjuction with the accompanying figures.

DESCRIPTION OF THE PREFERRED EMBODIMENT

Figure 1:
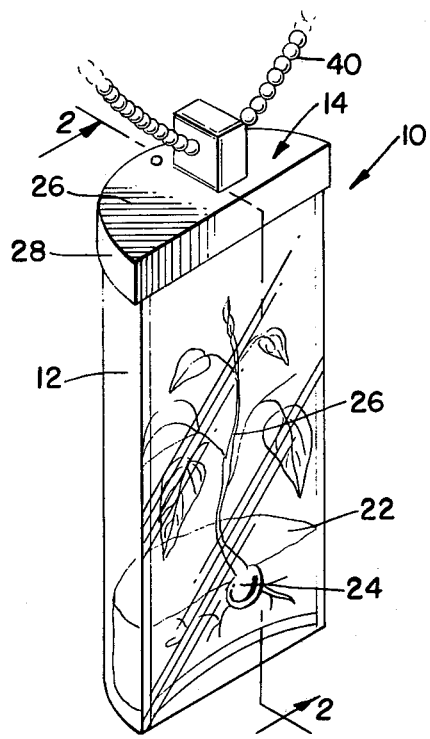
FIG. 1 is a perspective view of a seedling sprouter containing a sprouted seed.
Figure 2:
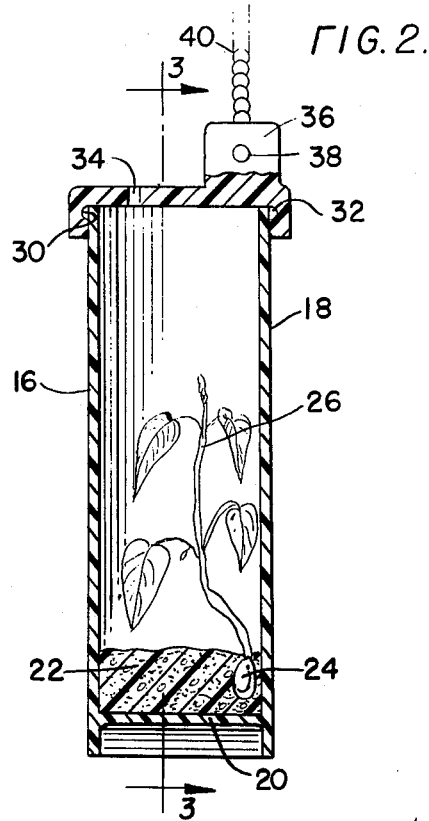
FIG. 2 is a sectional view of the seedling sprouter taken along line 2—2 of FIG. 1.

Referring first to FIG. 1, there is shown a seedling sprouter comprising a body portion 12 and a cap portion 14. The body 12 is in the shape of a half circular tube having one semicircular wall 16, a flat wall 18, and a bottom wall 20, best seen in FIG. 2. The body of the sprouter may be made of any transparent, substantially rigid material such as glass or plastic. Within the sprouter is a mass of material 22 and a seed 24 which has germinated to produce the sprout 26. The material 22 may be sponge or any other substance which is moisture absorbent and will function to hold the seed 24 in place against a lower wall portion of the sprouter.

The cap 14 may be molded rubber, plastic, or other flexible, shape-sustaining material. The cap includes a top portion 26 and a downwardly depending skirt portion 28. As seen most clearly in FIGS. 2 or 3, the skirt portion 28 is formed with a detent 30 which provides a snap fit for the cap 14 when the cap is pressed onto the sprouter body 12. The upper lip of the sprouter includes a rib 32 which mates with the detent 30 of the cap. The cap also includes an air vent aperture 34 and an upstanding lug 36 having a bore 38. A length of chain 40, cord, or other filament-like material, may be threaded through the bore 38 so that the cap and seedling sprouter may be suspended.

Figure 3:
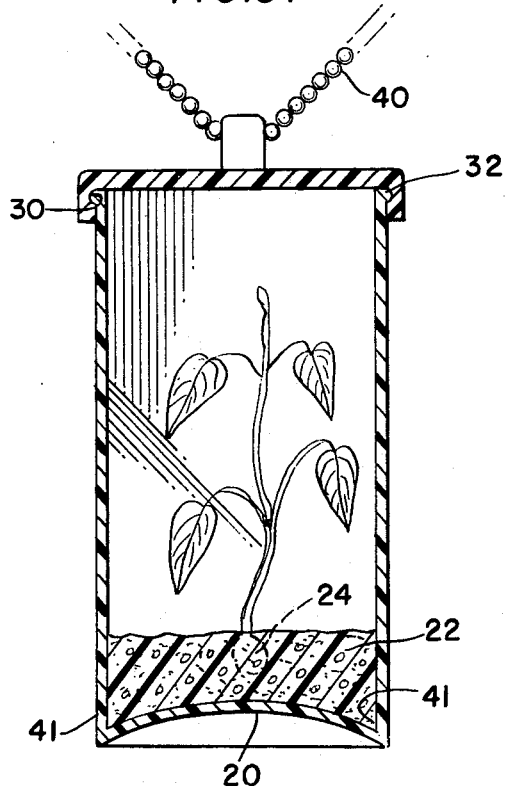
FIG. 3 is a sectional view of the seedling sprouter taken along line 3—3 of FIG. 2.

Turning now to FIG. 3, a sectional view of the sprouter with attached cap and a sprouted seed is shown. The bottom wall 20 of the sprouter is shown as having a generally inwardly domed shape. This shape allows excess moisture to drain from the regions of the sponge immediately adjacent the seed to the lowermost regions 41 of the sprouter. The excess moisture is stored in reserve and rotting of the seed due to waterlogging is avoided. It will be noted that while such a domed bottom wall is preferred, other shapes are contemplated and will be obvious to one skilled in the art.

Figure 4:
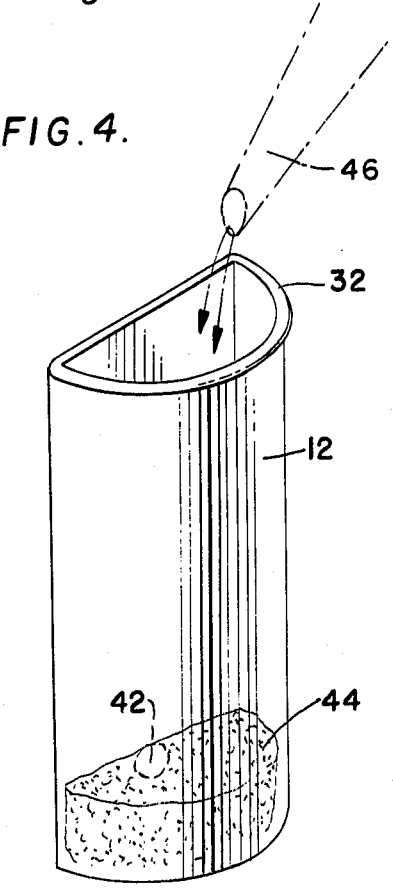
FIG. 4 is a perspective view of a seedling sprouter with the cap detached allowing the addition of water to the sprouter's interior.

Turning now to FIG. 4, it will be seen that water may be added to the sprouter 12 and its contents when the cap 14 has been removed. It is contemplated that the sprouter will contain only a sproutable seed 42 and a piece of dry sponge 44 when first obtained by an ultimate user. The sponge holds the seed 42 against a wall of the sprouter as shown. Water may be added from any suitable source 46, and this water will be absorbed by the sponge and will provide the moisture needed by the seed 42 in order to germinate. Once the water has been added, the cap 14 may be snapped into place and the entire device may be suspended by means of a chain or the like. The sprouter is of a size and weight to enable its wearing as an article of jewelry. After moisture has been added to the initially dry sponge and seed, the seed will germinate within a few days. The air vent aperture 34 allows the interior of the sprouter to breathe and rotting of the moistened seed is precluded. The type of seed which is used is not critical to the invention, and while a fruit or vegetable seed is contemplated, any seed which is capable of germination may be sprouted within the sprouter in the manner aforedescribed. While only one seed has been shown within the sprouter body, two or more may be simultaneously sprouted with identical results.

Having thus described the invention, other embodiments and modifications will occur to those skilled in the art, and such embodiments and modifications are intended to be within the scope of my invention as defined in the appended claims.

I claim:

1. A seedling sprouter comprising in combination:

a generally elongated body of transparent material having one curved side, one flat side, a bottom, and an open top;

a removable cap means for substantially closing said open top, said cap having a curved side and a flat side;

means on said cap for suspending said cap;

moisture holding material within said body; and means on said cap for the snap fit engagement of said cap and said body, whereby said cap and body may both be suspended by said suspension means and worn as an article of jewelry.

2. A wearable sprouter for supporting a seed and having means for supplying moisture thereto, the sprouter comprising in combination:

a hollow transparent body comprising side walls and one end wall, said side walls comprising a first curved wall and a second flat wall, said side walls having a rib at one end and said end wall being curved;

removable cap means for providing access to the interior of said body, said cap having a detent which engages said rib;

a dry mass of moisture absorbent material within said body; and suspension means for said body whereby said body may be worn as an article of jewelry, said suspension means comprising an upstanding lug on said cap, a bore through said lug, and filamentary material passing through said bore.

* * * * *